March 8, 1955  A. S. KARPER  2,703,744
ROTARY CARD FILE
Filed April 28, 1951  5 Sheets-Sheet 1
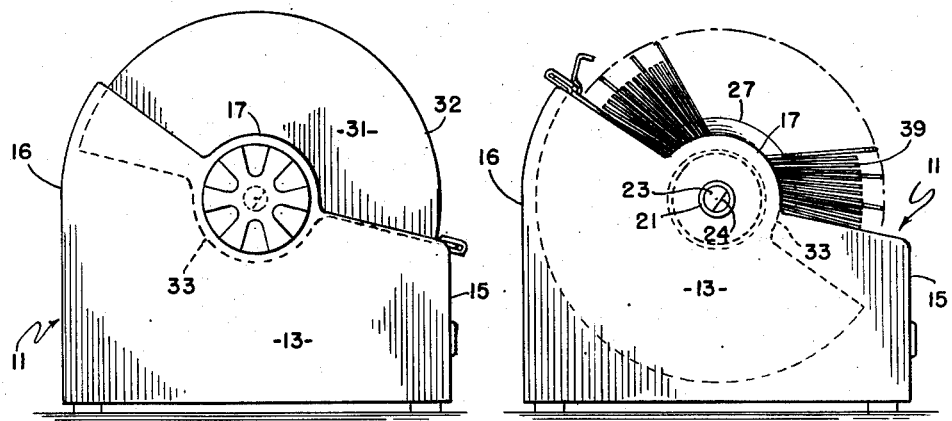
FIG. 1.  FIG. 2.
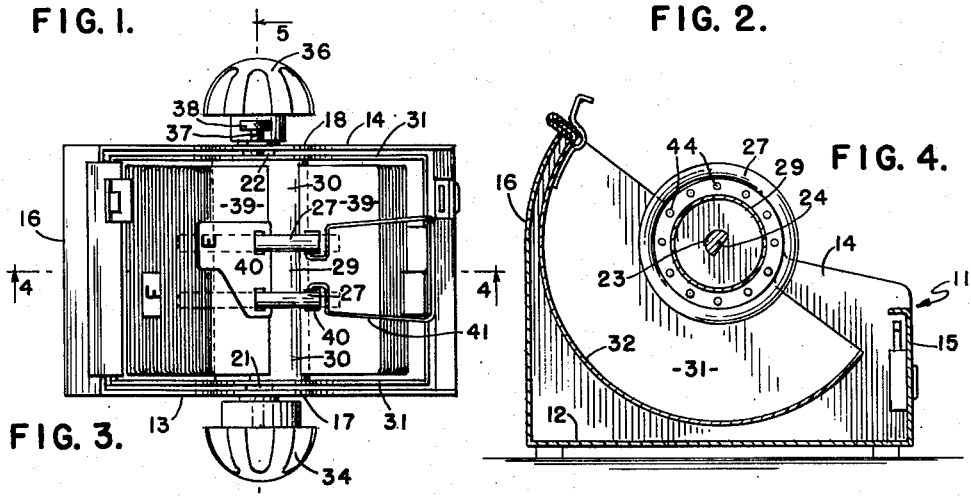
FIG. 3.  FIG. 4.
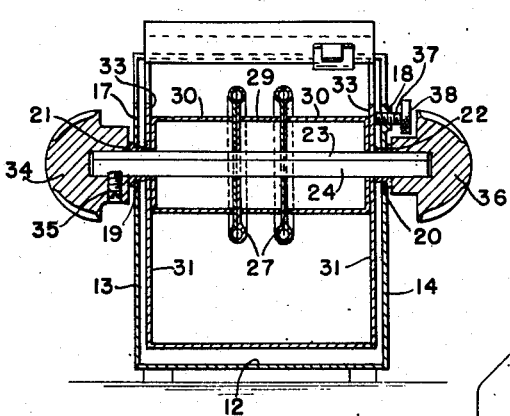
FIG. 5.
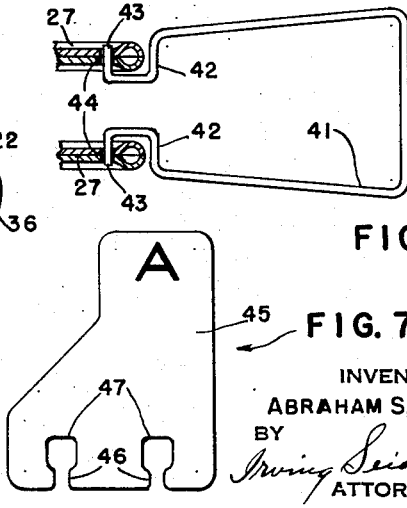
FIG. 6.
FIG. 7.
INVENTOR
ABRAHAM S. KARPER,
BY
Irving Seidman
ATTORNEY March 8, 1955  A. S. KARPER  2,703,744
ROTARY CARD FILE
Filed April 28, 1951  5 Sheets-Sheet 2
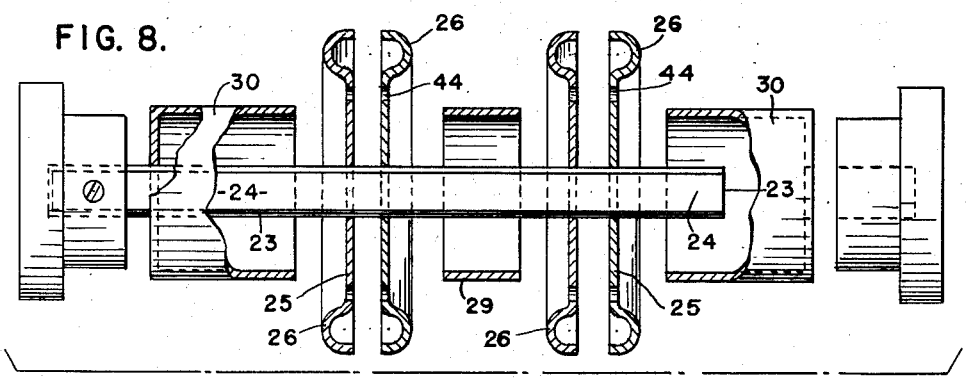
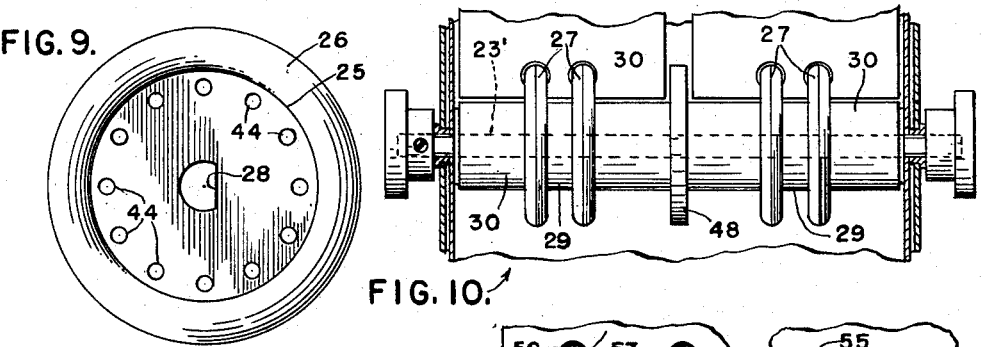
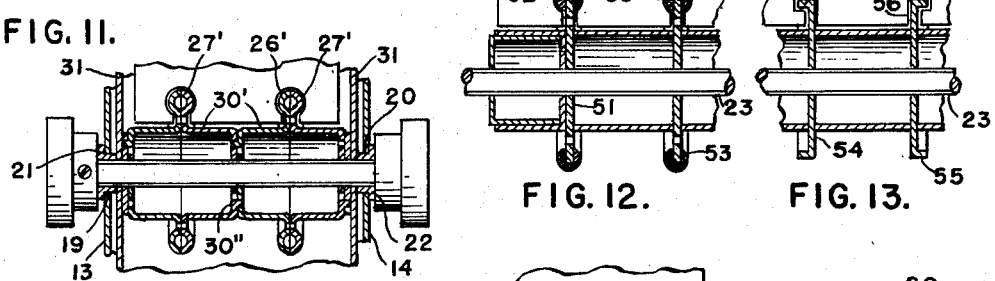
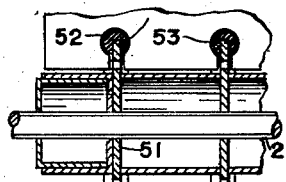
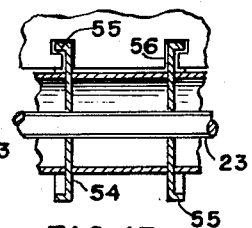
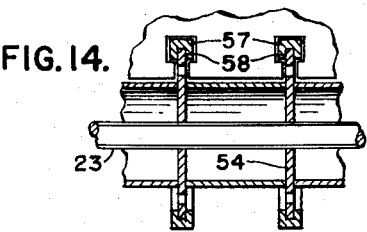
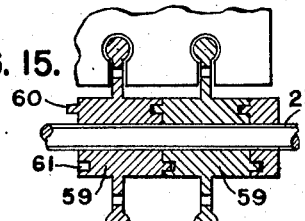
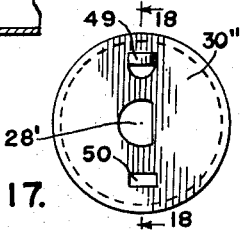
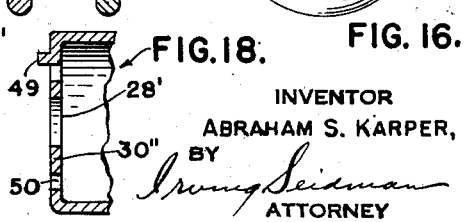
INVENTOR
ABRAHAM S. KARPER,
BY Irving Seidman
ATTORNEY March 8, 1955  A. S. KARPER  2,703,744
ROTARY CARD FILE Filed April 28, 1951  5 Sheets-Sheet 3

INVENTOR
ABRAHAM S. KARPER,
BY
Irving Seidman
ATTORNEY

March 8, 1955  A. S. KARPER  2,703,744
ROTARY CARD FILE
Filed April 28, 1951  5 Sheets-Sheet 4
FIG. 22.
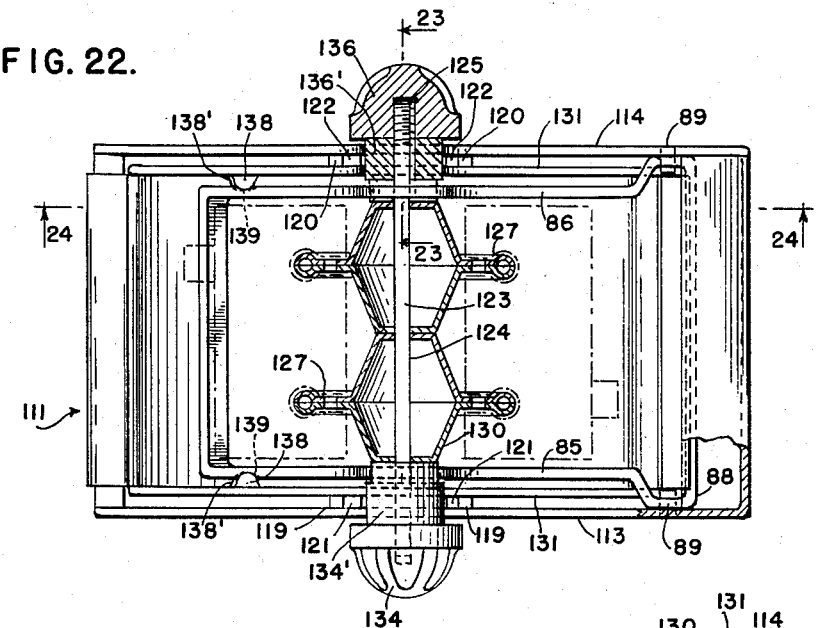
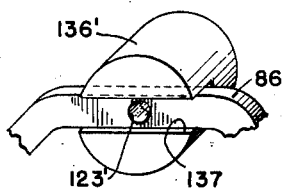
FIG. 24.
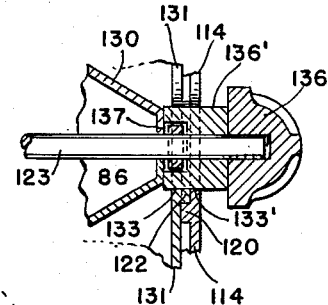
FIG. 23.
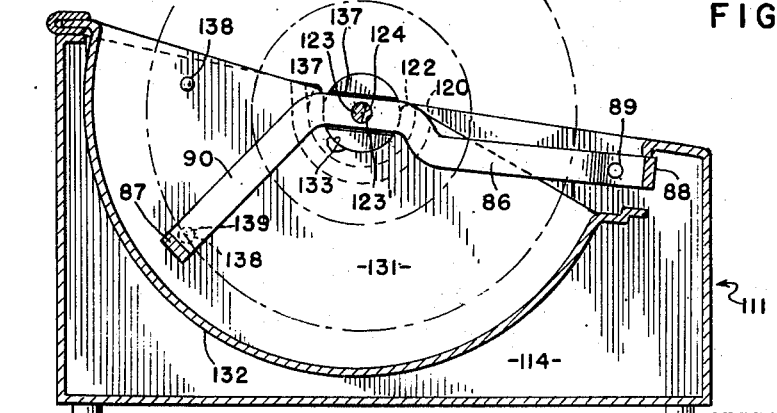
FIG. 25.
INVENTOR
ABRAHAM S. KARPER,
BY
Irving Seidman
ATTORNEY March 8, 1955

A. S. KARPER 2,703,744

ROTARY CARD FILE

Filed April 28, 1951

INVENTOR
ABRAHAM S. KARPER,
BY Irving Seidman
ATTORNEY ent Office

2,703,744
Patented Mar. 8, 1955

2,703,744

ROTARY CARD FILE

Abraham S. Karper, Jamaica, N. Y.

Application April 28, 1951, Serial No. 223,477

2 Claims. (Cl. 312—189)

This invention relates to rotary card indexes and has particular reference to rotary card indexes of the type wherein cards are removably attached to beaded rims formed upon the periphery of disks which are in turn carried upon a central shaft rotatable in a supporting frame or housing.

This application is a continuation-in-part of patent application, Serial No. 594,424, filed May 8, 1945, now Patent No. 2,628,618.

An object of this invention is the provision in a device of the type described, wherein the said beaded disks are slidable and keyed upon said rotatable shaft and are spaced apart upon the shaft by means of spacer units engageable around the said shaft.

A further object of this invention is the provision in a device of the type described, wherein the central supporting shaft is rotatably mounted in a base comprising an open top housing and a cover member is mounted upon the said central shaft and is rotatable upon and about the said central shaft.

A further object of this invention is the provision in a device of the character described, of braking means to hold the cover member in a fixed position.

A further object of this invention is the inclusion therein of index markers consisting of slotted tabs which are engageable over the said peripheral beaded rims formed upon the said disks and arranged between slotted cards also mounted upon the said peripheral beaded rims of the said disks.

A further object of this invention is the inclusion in a device of the character described, of a place holding member comprising a U-shaped bent spring element having hooked ends which are removably engageable in apertures formed in said disks.

A further object of this invention is the provision in a device of the character described, wherein the said disks and spacer units are formed as an integral unit.

A further object of this invention is the provision in a device of the character described, wherein beadless disks are provided with detachable slotted rims adapted to engage around the periphery of the beadless disks, the said slotted rims, when attached over the periphery of the disks adapted to provide the beaded portion thereon.

A further object of this invention is the provision in a device of the character described, wherein the disks are formed with hubs having lugs and complementary recesses, engageable with one another to lock the hubs and disks together.

A still further object of this invention is a device of the character described wherein a card carrying shaft is mounted upon a stand or supporting frame and a plurality of beaded disks are mounted upon the shaft, the said shaft being held at an angle to the supporting frame and slotted cards are mounted in step-up formation upon the said beaded disks.

Another object of this invention is the provision of a device as described, wherein means are provided for changing the angle of the said disk holding shaft with respect to the base of the supporting frame.

Another object of this invention is the provision in a device of the character described, of a tumbler base and supporting member to one end of which the shaft carrying the beaded disks is supported and which may be tumbled or turned to bring the shaft from a slanting position to a horizontal position.

A further object of this invention is the provision therein, of mounting the disk carrying shaft in a carriage which is pivotally attached at one end to the frame or housing and permits raising the shaft and supporting cards out of the housing thereby giving greater accessibility to the cards.

Another object of this invention is the provision therein of eccentrically mounting a cover member to move same forward during its closing movement and retard or move same backward during its opening or reverse movement.

A still further object of this invention is the provision of an organization in which the constituent elements are so arranged structurally and functionally as to assure improved results with materials and members which may be manufactured at reasonable cost, may be easily assembled and which will be efficient in operation with minimum wear to the parts.

The best embodiment of the invention has been chosen for illustrative purposes, but this embodiment should be viewed as being illustrative only and not as limiting because obviously the invention is capable of other embodiments having revised details of construction, so long as they fall within the ambit of the appended claims.

The invention itself, however, both as to its organization and its method of operation, will best be understood from the following description of a specific embodiment when read in connection with the accompanying drawings, in which:

Fig. 1 is a side elevational view of a card index device with the cover member in closed position.

Fig. 2 is a similar view showing the cover member retracted to open position.

Fig. 3 is a top or plan view of the open device shown in the side view in Fig. 2.

Fig. 4 is a longitudinal sectional elevation taken along line 4—4 of Fig. 3 but without the cards shown in Figs. 2 and 3.

Fig. 5 is a transverse section taken along the line 5—5 of Fig. 3.

Fig. 6 is a detail view of a place holding member which forms a part of this invention and which will be hereinafter described.

Fig. 7 is a detail view of an index tab used in this invention.

Fig. 8 is an exploded view (enlarged) of a portion of this invention and will hereinafter be fully explained.

Fig. 9 is a side view of a beaded disk forming a part of this invention.

Fig. 10 is a fragmentary detail showing an arrangement of parts for carrying two sets of cards.

Fig. 11 is a fragmentary sectional detail showing a modified form to be hereinafter explained.

Fig. 12 is a fragmentary sectional detail showing a modified form of disk and beaded edge.

Fig. 13 is a fragmentary sectional detail showing peripheral flanges in lieu of beaded rims.

Fig. 14 is a fragmentary sectional detail showing another form of rim.

Fig. 15 is a fragmentary sectional detail showing the beaded disks formed with hubs having interlocking pins thereon.

Fig. 16 is a side view of the beaded disk shown in Fig. 15.

Fig. 17 is an enlarged end elevational view of the beaded disk of Fig. 11.

Fig. 18 is a fragmentary section taken along line 18—18 of Fig. 17.

Fig. 22 is an open top view showing another form of application.

Fig. 23 is a fragmentary sectional detail taken along line 23—23 of Fig. 22.

Fig. 24 is a perspective view of a fragmentary part of this invention.

Fig. 25 is a longitudinal sectional view taken along line 24—24 of Fig. 22.

Figure 19:
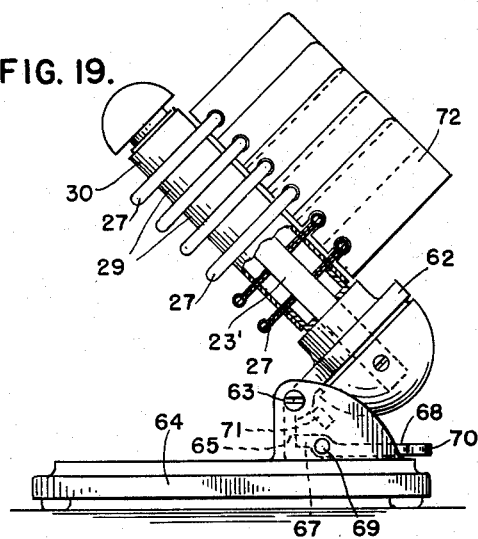
Fig. 19 is a side elevational view showing a modified form for mounting the beaded disks.

Referring in detail to the parts, 11 designates in general, a topless frame and closure member or housing, comprising a bottom 12, side walls 13 and 14, front wall 15 and rear wall 16. The side walls 13 and 14 are formed with upstanding extensions 17 and 18 respectively and are formed with apertures 19 and 20 in which bearing collars 21 and 22 respectively are mounted (Figs. 5, 10 and 11). Through these said bearing collars a supporting shaft 23, having a flattened portion 24 giving the said supporting shaft a D-shaped cross section, extends and has bearings in said bearing collars 21 and 22. Slidable upon the shaft 23 there are circular plates or disks 25 formed with half beads 26, along their peripheries. Two such plates, when placed together form a complete unit which will be termed the beaded disk 27 (Figs. 5 and 10).

The beaded disks 27 are formed with D-shaped orifices 28 through which the supporting shaft 23 passes when the said beaded disks 27 are mounted thereon. A tubular section 29 engages over the shaft 23 and functions as a spacer element between the beaded disks 27. A cup-shaped end spacer element 30 engages against and between beaded disks 29 and the side walls 31 of a cover member which has an arcuate top 32. The side walls 31 of the cover member are formed with ears 33 which extend beyond the open edges of the side walls (Figs. 1, 2 and 5) and provide the means for rotatably mounting the said cover member upon the supporting shaft 23. The said shaft 23 extends beyond both side walls 13 and 14 and the end extending through the side wall 13 is capped with a knob 34 which is secured to the shaft by a set screw 35 while the shaft end extending through the wall 14 is capped with a slip-on knob 36, a tight frictional contact being sufficient to keep it in place. A screw 37 having a knurled head 38, is threaded through the side wall 14 of the housing and contacts the side wall 31 of the cover member and acts, when screwed against the wall 31 as a brake to hold the cover member in place when in open or retracted position.

Cards 39 (Fig. 3) having cut out slots and grooves 40 are held in place by engagement of the cut out slots and grooves 40 over the beads 26 of the beaded disks 27. To hold a particular card in exposed position there is provided a marker 41 (Fig. 6) which comprises a spring wire bent into an approximate U-shape having at its inner open ends turned in hook members 42 and outwardly turned hook ends 43 which are adapted to engage through orifices 44 formed in the beaded disks 27. Index tabs 45 broadened at their inner edges and formed with slotted cut outs 46 and grooves 47 are provided to alphabetically space the cards (Figs. 3 and 7) In Figs. 3 and 5 a single series of cards is shown. Obviously the housing or frame may be widened to take two or more series of cards. Fig. 10 shows a housing widened to take two series of cards. In this form the supporting shaft 23' is lengthened and provided at its center with a dividing disks or washer 48. This disk or washer 48 may be dispensed with and the two cupped end spacer members 30 brought into contact. When, however, three or more series of cards are to employed, the shaft 23' is made of sufficient length to span the width of the housing braces (not shown) may be built up from the bottom of the housing and provide an intermediate bearing or bearings for the supporting shaft.

In Fig. 11 the bead 26' and cupped hub 30 of the disk 25' are formed in a single integral unit and may be arranged as indicated in the figure. Upon the heads 30" there is formed a punched out lug 49 and a cut out 50. The lug 49 engages a cut out in the contacting head while the cut out in the same head receives the lug projecting from the contacting head thereby locking the units together. When the heads are keyed upon the D-shaft 23 the lugs 49 and the cut outs 50 are complementary and will engage to lock the parts together (see also Figs. 17 and 18). Fig. 12 shows a disk 51 without the bead formation but shows a circular bead 52 of elastic material that has an internal groove 53 in which the peripheral edge of the disk 51 engages. Fig. 13 shows a disk 54 formed with a circumferential flange 55 which functions in a capacity similar to the aforesaid bead. In this form the cards are cut and punched to conform as at 56. In the type shown in Fig. 14 the disk is encircled by a split ring 57 having a groove 58, the said ring being made of material having sufficient resiliency to be snapped over the edge of the disk. Fig. 15 shows a solid form made of plastic or other suitable material and is provided with a hub portion 59 which is formed with complementary pins 60 and pin pockets 61.

Figure 20:
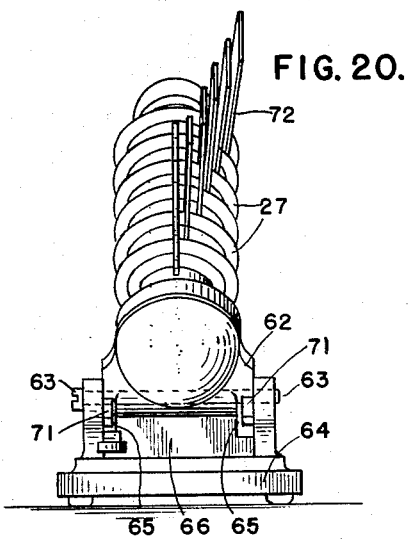
Fig. 20 is an end view of same.
Figure 21:
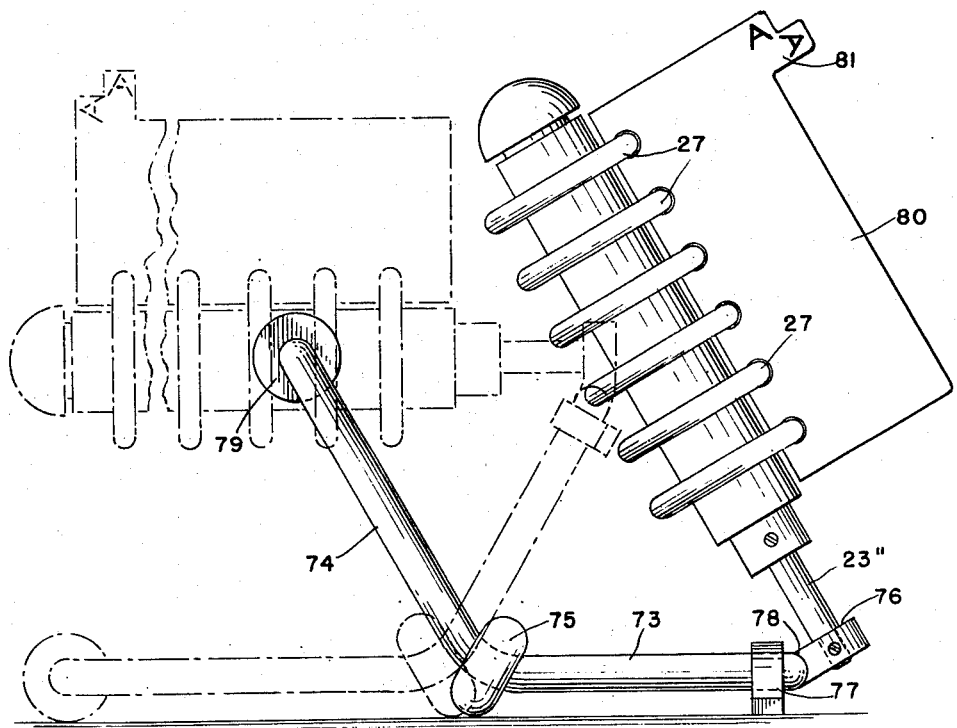
Fig. 21 shows another modification in which a supporting base is adaptable to two positions which will be hereinafter fully explained.

In Figs. 19 and 20 there is shown a form without a housing. In which form the supporting shaft 23' is carried upon a bracket 62 hinged at 63 to a base 64. A lug 65 extends downwardly from the bracket 62 and is held against the front wall 66 of the base 64 by a key 67 upon the inner end of a lever 68 which is pivoted to the base at 69. When so locked the supporting shaft 23' is held at an angle as shown, to the horizontal, but by lifting a handle 70 upon the outer end of the lever 68 the lug is released allowing the shaft 23' to come down to a horizontal position when the depending lug 65 stops against a projection 71. The form shown in Fig. 19 carries six beaded disks 27 and shows cards 72 in stepped up formation. Any number of beaded disks may be employed in this type depending upon the length of the supporting shaft 23'. The form shown in Fig. 21 is somewhat similar to the type shown in Figs. 19 and 20. The difference lies in the tumbler base which in said Fig. 21 comprises a bent endless bar which has a two angle base formation comprising a section 73 which is shown in horizontal position and a bent section 74. At the angle of the two sections there is provided a button formation 75, upon either leg (there being two leg sections 73 and 74 (not shown) running approximately parallel to each other and connected across their ends). The shaft 23" is secured, at an angle, at one end as at 76 and carries a plurality of beaded disks 27. Two buttons, 77, one upon each side at the junction of the cross bar 78 with each section 73, are provided as foot pieces. A single foot piece 79 is provided upon the cross bar connecting the outer ends of the sections 74. A single card 80 is indicated in this form. By tumbling the base, the shaft and the attached cards may be brought to a horizontal position as shown by the dot-dash lines. Upon the cards 80 there is shown a two way index tab 81 readily readable in either position.

Figure 26:
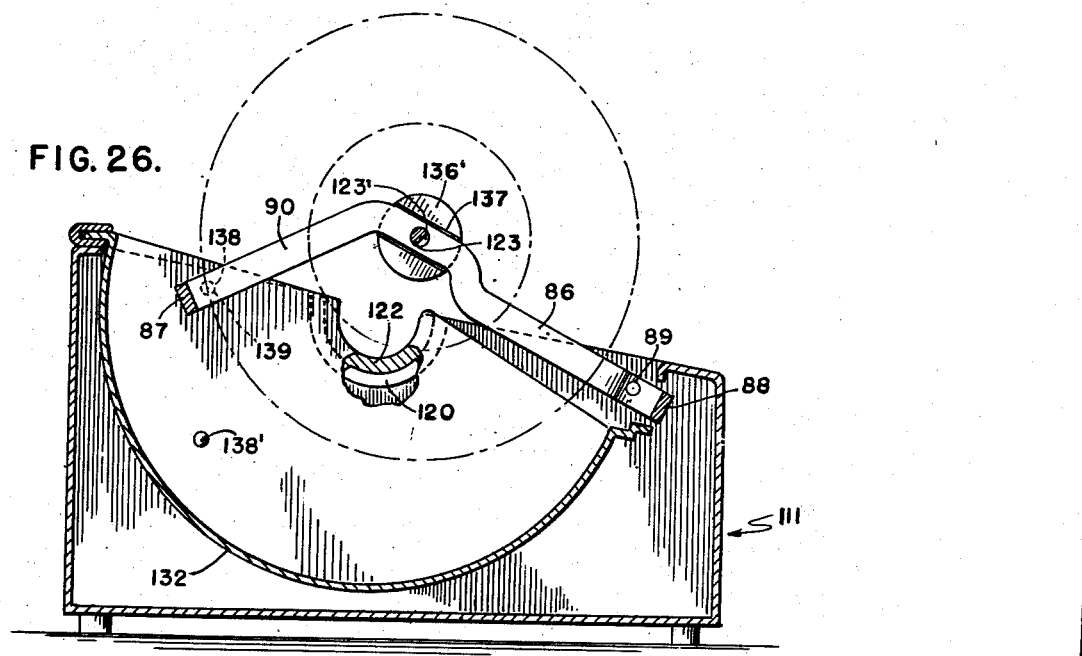
Fig. 26 is a similar section, partly broken away, and showing a pivoted part in raised position and will be hereinafter fully explained.
Figure 27:
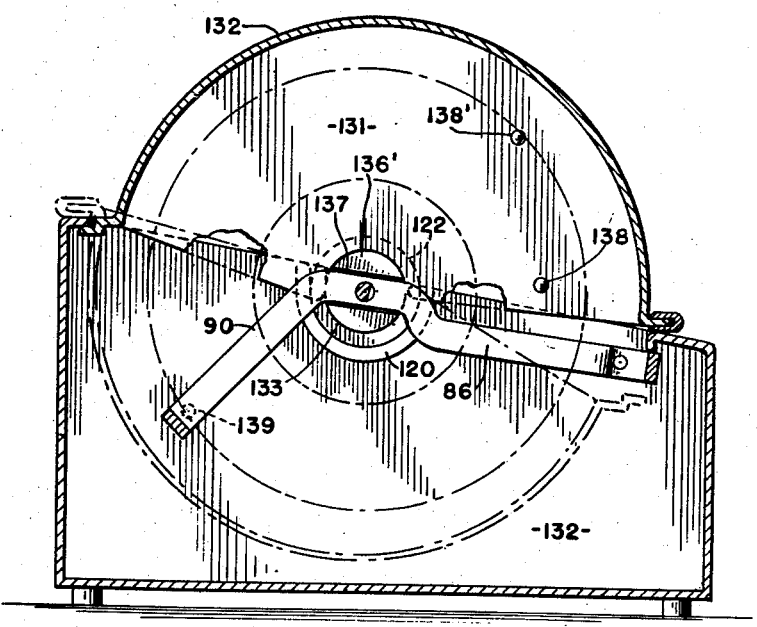
Fig. 27 is a view similar to Fig. 24 but shows a cover member in closed position.

In Figs. 22 to 27 inclusive, there is shown an embodiment wherein the reel or spool of cards may be moved up and out of the housing and held in raised position to give better reading and operating facilities. A carriage or carrier frame consisting of side arms 85 and 86 and cross bars 87 and 88, is pivotally attached at 89 to the side walls 113 and 114 of a housing 111. A cover member having side walls 131 and a semi-circular top 132 is formed with a semi-circular cut out 133 upon each of said side walls. The said cut outs 133 correspond to similar cut outs 117 and 118 formed upon the side walls 113 and 114 of the housing 111, respectively. Semi-circular projecting rims 121 and 122 are formed upon the said side walls 131 of the cover member (Figs. 22 and 23 and 25 to 27 inclusive) and provide bearing shoulders 119 and 120 formed upon the side walls 113 and 114 of the housing respectively. The said semi-circular bearing shoulders support the said cover member when same is in retracted or open position as shown in Figs. 26 and 27.

A supporting shaft 123 having a flattened surface 124 engages through circular apertures 123' formed in the side bars 85 and 86 of the said carrier frame and extends beyond said side bars 85 and 86 (Fig. 22). A knob 134 is fixed upon one extending end of the supporting shaft 123 by means of a set screw (not shown) while at the opposite extending end of the shaft 123 there is attached, by frictional contact, a second knob 136. Slidably engagable upon the shaft 123, at both ends thereof, and in contact with the said knobs 134 and 136 are circular spacer blocks 134' and 136' respectively (Figs. 22 to 27). The inner faces of the said spacer blocks 134' and 136' are formed with grooves 137 within which the side bars 85 and 86 are nested. The circular surface of the spacer blocks 134' and 136' provide a bearing for the cover member when same is revolved to closed position as best shown in Fig. 27. The inner surface of the space blocks 134' and 136' engage the ends of the cupped spacer portion 130 of beaded disks 127 and when the knob 136 is turned upon threaded portion 125 upon the shaft 123 a pressure will be exerted upon the beaded disks 127 between the spacer blocks 134' and 136' and act to brake the parts and prevent the undue movement of same.

When the cover member is in open position (Fig. 26) the carrier comprising the side bars 85 and 86 and cross bars 87 and 88 may be drawn up out of the cover member and housing and held thus in its raised position by the frictional contact of buttons 138, formed upon the side walls 131 of the cover member, with an indent 139 formed in the said side-bars 85 and 86. A similar button 138' is formed upon the side walls of the cover member to hold the carrier in its lowered position while the cover member is in retracted or open position.

The dot-dash circles in Figs. 2, 25, 26 and 27 indicate the circular path of the outer edge of the index tabs upon the cards.

The cover member is eccentrically mounted, with respect to the rotation of the supporting shaft and when rotated upwardly to its closed position, it moves forwardly and when retracted to open position (see Figs. 26 and 27) thereby giving accessibility to the cards.

I claim:

1. A rotary index card filing device comprising an open top casing, a shaft rotatably mounted in said casing, knobs upon the said shaft for turning same, a series of annularly beaded disks mounted and spaced apart upon said shaft, the said disks being formed of dual plates each having annular half-beads thereon and adapted to be held and conjointly form a peripheral bead upon the said beaded disk and index cards having cut outs and grooves thereon adapted to engage the said peripheral beads upon the said beaded disks.

2. A rotary card index filing device as set forth in claim 1 wherein the said beaded disks are formed with an annular row of orifices and including spring wire markers having hook ends adapted to engage in said orifices for holding any card in exposed position.

References Cited in the file of this patent

UNITED STATES PATENTS

| | | |
|---|---|---|
| 2,213,825 | Seeley | Sept. 3, 1940 |
| 2,231,029 | Scholfield | Feb. 11, 1941 |
| 2,286,911 | Hayes | June 16, 1942 |
| 2,441,717 | Nero | May 18, 1948 |
| 2,493,167 | Scholfield | Jan. 3, 1950 |
| 2,510,924 | Bruen | June 6, 1950 |
| 2,541,185 | Adams | Feb. 13, 1951 |